United States Patent
Boswell et al.

[11] Patent Number: 6,129,258
[45] Date of Patent: Oct. 10, 2000

[54] MUFFLE CONVECTION BRAZING AND ANNEALING SYSTEM AND METHOD

[75] Inventors: Jeffrey W. Boswell, Cochranton, Pa.; Riaan Oosthuysen, Pinetown, South Africa

[73] Assignee: Seco/Warwick Corporation, Meadville, Pa.

[21] Appl. No.: 09/250,268

[22] Filed: Feb. 16, 1999

[51] Int. Cl.[7] .......................... B23Q 15/00; B23K 13/08; F27B 9/06; F27D 11/00
[52] U.S. Cl. .................... 228/102; 228/8; 228/9; 219/388
[58] Field of Search .................... 228/102, 232, 228/8, 9; 219/390, 388

[56] References Cited

U.S. PATENT DOCUMENTS

| | | | |
|---|---|---|---|
| 3,261,596 | 7/1966 | Bowman | 263/8 |
| 3,807,943 | 4/1974 | McKinstry | 432/135 |
| 3,854,918 | 12/1974 | McKinstry | 65/30 |
| 4,012,190 | 3/1977 | Dicks et al. | 432/48 |
| 4,195,820 | 4/1980 | Berg | 266/87 |
| 4,416,623 | 11/1983 | Takahashi | 432/36 |
| 4,775,776 | 10/1988 | Rahn et al. | 219/388 |
| 4,909,430 | 3/1990 | Yokota | 228/102 |
| 5,147,083 | 9/1992 | Halstead et al. | 228/42 |
| 5,232,145 | 8/1993 | Alley et al. | 228/102 |
| 5,271,545 | 12/1993 | Boswell et al. | 228/43 |
| 5,291,514 | 3/1994 | Heitmann | 373/135 |
| 5,467,912 | 11/1995 | Mishina et al. | 228/10 |
| 5,573,688 | 11/1996 | Chanasyk et al. | 219/388 |
| 5,971,249 | 10/1999 | Berkin | 228/102 |
| 5,971,284 | 10/1999 | Hammer | 236/11 |

*Primary Examiner*—Patrick Ryan
*Assistant Examiner*—L. Edmondson
*Attorney, Agent, or Firm*—Oliff & Berridge, PLC

[57] ABSTRACT

A temperature control system for obtaining a desired soak temperature of a workpiece driven through the brazing and annealing system includes a convection muffle for heating the workpiece within a brazing zone of the brazing and annealing system. The temperature control system also includes a first thermocouple positioned above the workpiece and measures a first real-time temperature of an atmospheric convection current directed towards the workpiece before the workpiece absorbs heat from the atmospheric convection current. A second thermocouple is positioned beneath the workpiece and measures a second real-time temperature of the atmospheric convection current after the workpiece has absorbed the heat from the atmospheric convection current. The temperature control system also includes a controller that measures a brazing temperature of the atmospheric convection current directed toward the workpiece based on a temperature difference between the first and second real-time temperatures measured by the first and second thermocouples. When the first and second real-time temperatures correspond to the desired soak temperature, a timer is initiated to soak the workpiece at the desired soak temperature for a predetermined amount of time.

32 Claims, 2 Drawing Sheets

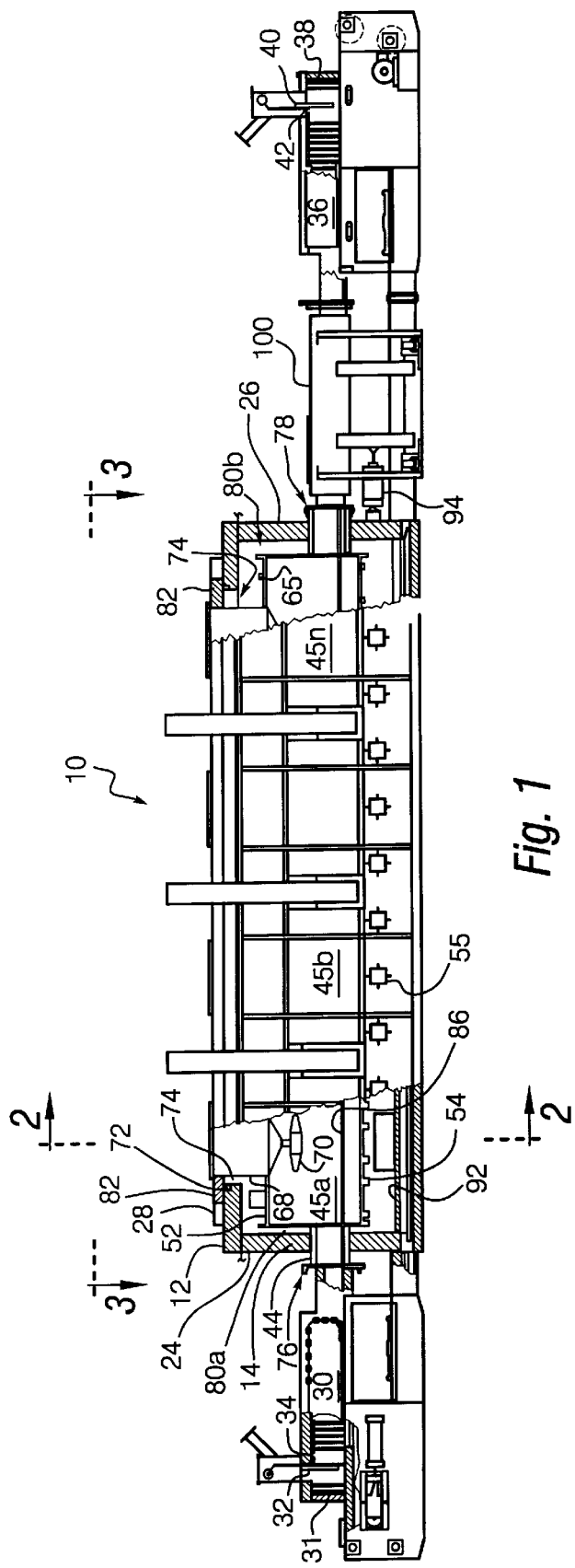

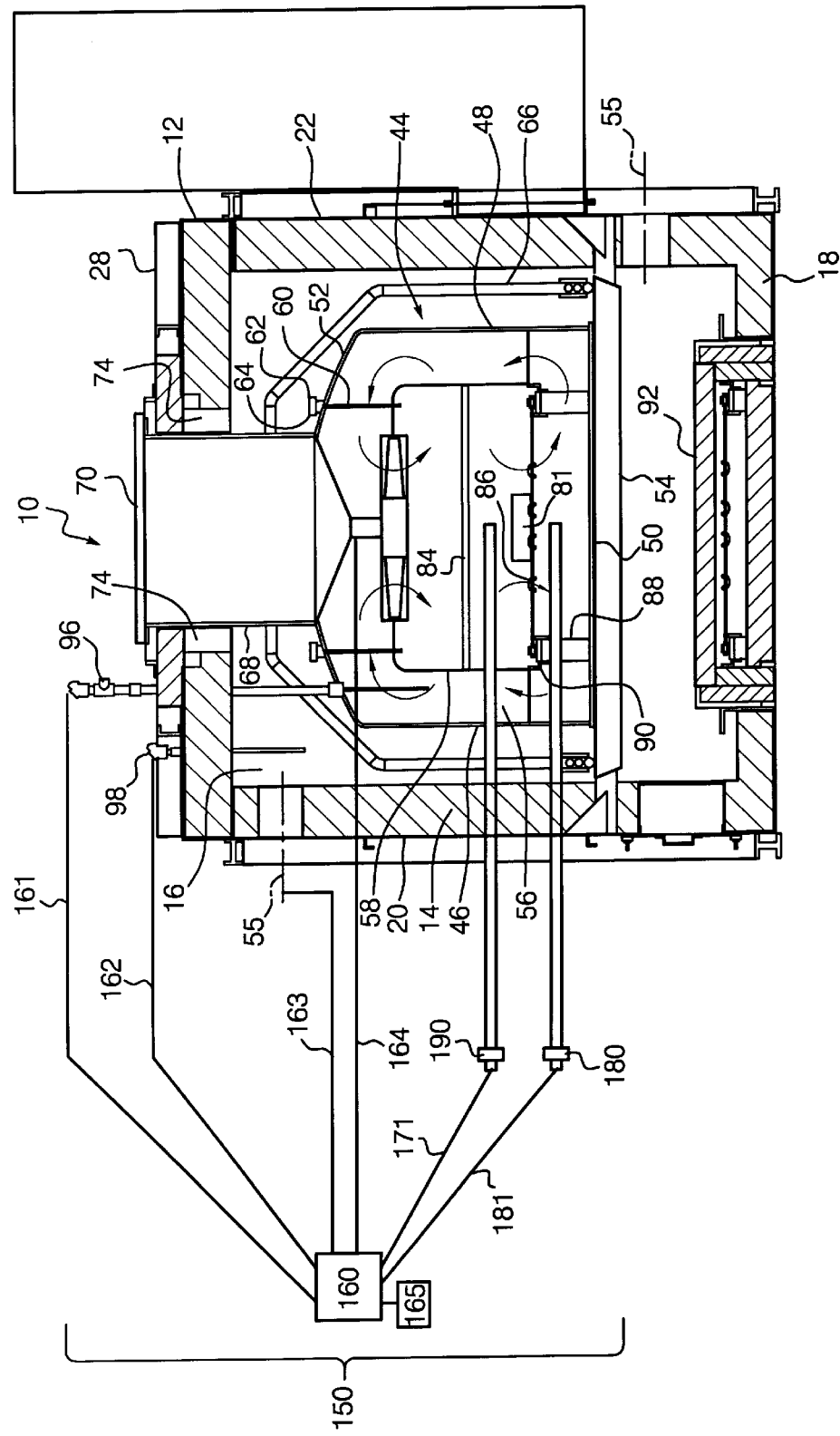

MUFFLE CONVECTION BRAZING AND ANNEALING SYSTEM AND METHOD

INCORPORATION BY REFERENCE

The disclosure of U.S. Pat. No. 5,271,545 to Boswell et al., which issued on Dec. 21, 1993, and the article entitled "Active Only", the Ultimate in Flexibility, which was published in *The Metal Minutes,* Fall/Winter 1997 and authored by the inventor of the instant application are herein incorporated by reference in their entirety.

BACKGROUND OF THE INVENTION

1. Field of Invention

The invention relates generally to a heat treating furnace used for the brazing and/or annealing of workpieces. More particularly, the invention relates to a system and method for brazing and/or annealing a workpiece which produces forced convection heat transfer and accurate temperature control and uniformity.

2. Description of Related Art

As is generally well-known in the art of heat-treating, brazing and annealing require a close tolerance on the temperature control in order to achieve a desired temperature profile or to maintain temperature uniformity within a workpiece. Convection heat transfer has been found to provide faster heating or cooling of the workpiece on a more uniform basis. In such convection heat transfer, the hot gases are typically directed at the workpiece by jets or fans, with the fans being the more common apparatus to impart velocity to the gases.

Further, the brazing and annealing processes may also have to be performed in a special or protective-treatment atmosphere, such as nitrogen or an exothermic gas, which creates conditions that prevent oxidation of the workpiece, or imparts other desirable characteristics such as the reduction of oxides. When a combination of rapid heat transfer and a controlled atmosphere has been required, the conventional practice has been to introduce the desired atmosphere into a sealed furnace. Furnaces of the so-called continuous operation type have an inlet and an outlet which are provided with baffles so as to reduce loss of heat to the atmosphere. To protect the atmosphere from contamination due to leakage, these furnaces are heated by gas-fired radiant tube burners or electrically-heated elements such as electrical resistors.

In this manner, such convective heat transfer is attained by the fans or jets being mounted in and extending through the side walls or the roof of the furnace. These controlled-atmosphere furnaces generally perform adequately if the furnace insulation does not react with the atmosphere, permit loss of the atmosphere, or cause product/process contamination by deposition of dust resulting from degradation of the insulation. Further, in cases when purity of the atmosphere is critical, the furnace system must be purged for extended periods of time so as to remove the contamination gases from the voids in the insulation.

In order to prevent the contamination problem as described above, a gas-impervious metallic inner liner has been conventionally used to isolate the workpiece in the controlled-atmosphere form the insulation. An example of a conventional convection braze furnace having a lined atmosphere for brazing aluminum heat exchangers is illustrated and described in U.S. Pat. No. 5,147,083 to Gary A. Halstead et al., issued on Sep. 15, 1992 (hereinafter the '083 patent). However, the use of the inner liner suffers from the disadvantage that it is required to be rigidly positioned with respect to fans, doors, and heating/cooling devices, since these items are mounted and sealed to the furnace outer shell.

Another drawback lies in the fact that the need for rigid mounting of the inner liner imposes stresses thereon as a result of differential thermal expansion and contraction between the inner liner and the furnace casing. While various mechanisms have been used to absorb or counteract the stresses due to the differential expansion and contraction, these stresses eventually lead to destruction of the integrity of the liner due to the temperatures normally encountered in the brazing and annealing processes. This problem becomes even more detrimental because replacement of the liner then becomes necessary, which is a very expensive and labor intensive since the furnace must essentially be completely disassembled in order to remove the existing liner and build a new one in its place.

Moreover, another difficulty results from the necessity of supplying heating or cooling through the radiant tubes which isolates a gaseous media from the furnace atmosphere. This results in low heat transfer rates from these items to the recirculating atmosphere. Also, radiant tubes are temperature limited by the materials of construction that can be used, thereby further reducing heating capacity. Leakage of gases through the radiant tubes and leakage around penetrations are also additional sources of atmospheric contamination.

Muffle-type furnaces have also been used conventionally to overcome the disadvantages of the traditional lined controlled-atmosphere furnaces. However, these muffle-type furnaces are also subject to problems. In particular, since the muffle has the capability of being freely movable with the thermal forces, no suitable way has been developed to equip a muffle-type furnace with recirculating fans for imparting convection heat transfer to the workpiece within the muffle so as to produce increased heating rates as well as high thermal efficiencies.

SUMMARY OF THE INVENTION

Accordingly, it is an object of the present invention to provide a muffle convection brazing/annealing furnace system and method which is relatively simple and economical to manufacture, assemble, and implement, but yet overcomes the disadvantages of the conventional furnaces.

In particular, according to a first aspect of the invention, a temperature control system for obtaining a desired soak temperature of a workpiece driven through a brazing and annealing system includes a convection muffle that heats the workpiece within a brazing zone of the brazing and annealing system. The temperature control system includes a first thermocouple positioned above the workpiece. The first thermocouple measures a first real-time temperature of an atmospheric convection current directed towards the workpiece before the workpiece absorbs heat from the atmospheric convection current.

The temperature control system also includes a second thermocouple positioned beneath the workpiece. The second thermocouple measures a second real-time temperature of the atmospheric convection current after the workpiece has absorbed the heat from the atmospheric convection current. The temperature control system also includes a controller that measures a brazing temperature of the atmospheric convection current directed toward the workpiece. When the temperature from the first and second real-time temperatures, as measured by the first and second thermocouples corresponds with the desired soak temperature a timer is initiated to soak the workpiece in the soak temperature for a predetermined amount of time.

According to a second aspect of the invention, the temperature control system also includes a circulating fan in a roof of the muffle that creates the atmospheric convection current. The controller of the temperature control system increases a fan speed of the fan when the temperature difference between the first and second real-time temperatures is greater than zero. Furthermore, the controller of the temperature control system maintains a fan speed of the fan when the temperature difference between the first and second real-time temperatures is zero. Additionally, the controller of the temperature control system decreases a fan speed of the fan when the temperature difference between the first and second real-time temperatures is less than zero.

According to a third aspect of the invention, the temperature control system also includes a third thermocouple positioned within the muffle and distal from the workpiece. The third thermocouple measures a third real-time temperature of a processed gas directed towards the interior of the muffle. The controller adjusts an amount of a fuel gas provided to direct-fired burners that heat the exterior of the muffle to adjust the brazing temperature of the atmospheric convection current directed towards the workpiece.

According to a fourth aspect of the invention, the convection muffle system for brazing and/or annealing a workpiece includes a heating chamber. A muffle can be divided into a plurality of successive individual brazing zones which are spaced apart. Also, a plurality of towers can be formed integrally with a roof of the muffle in each brazing zone and mounted movable relative to a top wall of the heating chamber. Furthermore, a circulating fan is mounted and sealed in a corresponding one of the plurality of towers for creating an atmospheric convection current in each of the brazing zones. The fans are movable along with the muffle during expansion and contraction of the muffle.

The muffle convection system also includes direct-fired burners, or electric heating elements, that heat the exterior of the muffle to increase the temperature of the atmospheric convection current. Additionally, the temperature control system obtains the desired soak temperature of the workpiece driven through the muffle. The temperature control system includes the features discussed above.

According to a fifth aspect of the invention, a method for obtaining the desired soak temperature of the workpiece driven through the convection muffle brazing and annealing system using the temperature control system discussed above includes positioning a first thermocouple above the workpiece. Then, a second thermocouple is positioned beneath the workpiece. An atmospheric convection current is then directed towards the workpiece so that first and second real-time temperatures of the atmospheric convection current can be measured. A flow of the atmospheric convection current is then adjusted based on a temperature difference between the first and second real-time temperatures until the brazing temperature corresponds to the desired soak temperature.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 1 is a side elevational view, partly fragmentary, of a muffle convection brazing/annealing system, according to the invention;

FIG. 2 is a cross-sectional view taken along plane 2—2 of FIG. 1; and

FIG. 3 is a top plan view of the muffle convection system, taken along plane 3—3 of FIG. 1.

DETAILED DESCRIPTION OF PREFERRED EMBODIMENTS

Referring now in detail to the drawings, there is illustrated in FIGS. 1 through 3 a muffle convection brazing/annealing system 1 having a muffle convection brazing/annealing furnace 10.

FIG. 1 shows that the muffle convection system 1 includes the muffle furnace 10 which is formed of a sheet metal outer shell 12 that is lined with a layer 14 of insulating refractory material on its interior. The furnace 10 has a front wall 24, a rear wall 26 and a top wall or roof 28.

Extending longitudinally and upstream of the front wall 24, there is provided an entrance chamber 30 having atmospheric curtains 31 formed therein and a front door 32 that covers an entrance opening 34. Similarly, there is provided an exit chamber 36 extending longitudinally and downstream of the rear wall 26 which is formed with atmospheric curtains 38 and a rear door 40 that covers an exit opening 42. The front and rear doors 32, 40 are adapted to slide in a vertical plane under control of conventional elevating mechanisms (not shown).

There is provided a muffle 44 having an arch-shaped roof 52 that defines a D-shaped muffle, which extends longitudinally between the front wall 24 and the rear wall 26 of the furnace. The muffle 44 is divided into a plurality of individual convection brazing zones 45a, 45b, . . . 45n. The muffle 44 is supported at predetermined intervals along its length by muffle supports, such as, for example, beams 54. The beams 54 extend through the refractory material 14 and are fixedly attached to the outer shell 12 of the furnace 10.

A plurality of direct-fired gas burners 55 extend through the furnace 10 so as to directly heat the exterior of the muffle 44. Although direct-fired burners 55 are shown and described herein, it should be understood that other known or subsequently developed devices that can directly heat the exterior of the muffle 44, such as, for example, electric heating elements, can be used. The radiant tubes of the conventional braze furnace disclosed in the '083 patent are not used herein. In accordance with the conventional art, radiant tubes are heated by hot gases from a burner or other heat sources flowing through the inside of the tubes, and thus lose heat from their exterior surfaces by radiation and convection heat transfer. For a fixed set of conditions, the ability of radiant tubes to receive and transfer heat becomes dependent upon the surface area available for heat transfer. The length and number of radiant tubes that can be installed in a furnace is limited by physical and technical constraints which fix heat transfer areas. It has been established that radiant tubes can have a thermal efficiency of no more than 50%. In other words, one-half of the heat input is lost in the flue gases. On the other hand, the direct-fire convection muffle furnace described herein can have a thermal efficiency of 68%.

Process gas, such as nitrogen or an exothermic gas, is injected under pressure into each of the plurality of convection brazing zones 45a through 45n by connection inlet means 65 operatively coupled, such as by welding, to the muffle 44. For a continuous operation, the process gas is continuously supplied to the muffle 44 so as to pressurize the brazing zones 45a–45n and to replace any gas which is lost due to escape through the atmospheric curtains 31, 38 and associated front and rear doors 32, 40.

Since the muffle 44 is a continuous gas-impervious member, it serves to protect the workpieces that are to be heat-treated from contamination. The muffle 44 is advantageous from the standpoint that it can be directly heated or cooled, and can be easily removed from the furnace 10 for repair or replacement. Furthermore, the muffle 44 has another advantage in that it is free to expand, thereby virtually eliminating differential thermal expansion and contraction problems. As a result, the muffle 44 can be built from a variety of different materials which are of a heavier gauge than those traditionally used in forming the rigid inner liner of the conventional braze furnaces. Therefore, by using materials of heavier gauge, the useful life of the furnace system 1 can be readily extended.

It is conventionally known that forced convection heat transfer is a much more efficient method of heating workpieces than either radiant heat transfer or natural convection heat transfer. However, until recently, it was not known how to utilize fans internally to the muffle 44 so as to impart such forced convective heat transfer since the muffle 44 moved freely with thermal forces. The subject invention overcomes the deficiencies in the conventional braze furnaces by providing a muffle tower 68 which can be formed as an integral part of the muffle 44 in each brazing zone 45a–45n and mounting a circulating fan 70 in each muffle tower 68 so that it is free to move as the muffle 44 expands and contracts. This combination of direct heating and forced convective heat transfer has increased significantly the heating rates and the thermal efficiencies over the conventional indirect-fired (radiant tube) atmosphere furnaces with convective heat transfer.

Each of the muffle towers 68 in the convective brazing zones 45a–45n is formed integrally with the arch-shaped roof 52 of the muffle and extends vertically through aligned openings 72 disposed in the furnace roof 28. The diameter of the openings 72 is somewhat larger than the diameter of the muffle towers 68 so as to provide a space or area 74 on each side thereof. As a result, each muffle tower 68 is permitted to move laterally relative to the outer shell 12 of the furnace 10 to absorb longitudinal expansion and contraction of the muffle 44 without contaminating the controlled atmosphere in the convective brazing zones 45a–45n. The muffle 44 is rigidly fixed in an end 76 adjacent the entrance chamber 30, and is suspended to freely move at another end 78 adjacent the exit chamber 36. Further, there are provided spaces or areas 80a and 80b adjacent the respective front and rear walls 24, 26 of the furnace 10 so as to define expansion zones to accommodate the longitudinal expansion and contraction of the muffle 44.

An insulating sliding seal 82 surrounds the upper section of each tower 68 and is disposed on top of the furnace roof 28 so as to cover the opening 72, thereby producing a gas-tight seal. Workpieces that are to be heat-treated are carried by a conveyor 86 that successively transports each workpiece 81 through the muffle 44. The conveyor 86 is also movable through an insulated conveyor return or trough 92 that returns the same to the front of the furnace 10. Some preheating of the conveyor 86 is obtained by the normal heat loss through the insulation thereof.

A pneumatic cylinder 94 is disposed at the rear wall 26 of the furnace so as to maintain a constant tension on the muffle 44. This serves to overcome the frictional forces that could prevent the muffle 44 from expanding lengthwise in a uniform manner, thereby causing deformation of the muffle 44.

From the last convective brazing zone (i.e., zone 45n), each workpiece 81 is transported to a cooling zone 100 in which it is cooled so as to solidify the brazed material. Upon leaving the cooling zone 100, the workpieces are conveyed to the exit chamber 36 through the atmospheric curtains 38 and then out the rear door 40. A continuous flow of the process gas is supplied in the exit chamber 36 so as to prevent air infiltration, thereby avoiding contamination of the controlled atmosphere in the brazing zone.

FIG. 2 shows that the outer shell 12 and layer 14 define an insulated heating space or chamber 16 which surrounds the muffle 44. Additionally, the furnace 10 also includes a bottom wall 18 and a pair of side walls 20 and 22. The heating chamber 16 surrounds the side walls 46 and 48 and the floor 50 of the muffle 44 and permits the heated gases to rise to heat the exterior of the muffle 44.

The side walls 46 and 48 are arranged to extend vertically and are disposed in a parallel, spaced apart relationship to the furnace sides walls 20 and 22, respectively. Furthermore, the burners 55 extend through the upper and lower parts of the side walls 46 and 48 to directly heat the exterior of the muffle 44. Although the side walls 46 and 48, floor 50 and arch-shaped roof 52 define a D-shaped muffle 44, it should be apparent to those skilled in the art that the muffle 44 may be formed of any number of shapes.

Zone divider plates 56 separate the individual convection brazing zones 45a–45n, as shown in FIG. 3. The plates 56 are rigidly attached to the ends of internal barriers or baffles to form a plenum 58. The barriers of the plenum 58 are suspended by plenum support rods 60. Access ports 62 are provided for installation of the support rods 60 to the muffle 44 as well as for permitting access for future adjustments. The ends of the ports 62 are closed by threaded caps 64 to eliminate entry of the external atmosphere and maintain a gas tight seal.

A heating annulus 66 is disposed between the muffle side walls 46 and 48 and the furnace side walls 20 and 22 so that the process gas can be fed through the annulus 66 to preheat the muffle 44. The annulus 66 is permitted to move with the muffle 44 by flexible connections (not shown) mounted externally to the furnace 10.

The deep well plug circulating fans 70 are mounted and sealed in each tower 68 associated with a respective brazing zone 45a–45n that convectively circulate the processed gas through the plenum 58 so the workpiece 81 on the conveyor 86 can be heat treated. The fans 70 create an atmosphere convection current within the brazing zones 45a–45n.

As illustrated by the arrows in FIG. 2, the process gas is discharged downwardly from the fan 70 at the top of the internal baffle through the plenum 58, then upwardly on each interior side of the muffle 44 where the gas is either heated or cooled before the gas flows back toward the fan 70. Fixed louvers 84 are disposed within the plenum 58 to uniformly direct the flow of the processed gas perpendicularly and downwardly towards a top surface of the workpiece 81. The louvers 84 are attached to the interior of the side barriers or baffles which form the plenum 58.

The conveyor 86 is supported by piers 88 that are permanently mounted to the inner surface of the floor 50 of the muffle 44. The floor 50 is supported at predetermined intervals along its length by the muffle supporting beams 54. Also, guides 90 are attached to the piers 88 that insures proper tracking of the conveyor 86 as it is driven through the furnace 10.

The furnace 10 is coupled with an advanced temperature control system 150. The control system 150 includes a controller 160 that controls, among other components of the system 1, four sets of thermocouples and a fan in each respective brazing zone, wherein each set of thermocouples has a thermocouple in a brazing zone. The controller 160 also measures a brazing temperature of the atmospheric convection current directed towards the workpiece 81.

The first set of thermocouples 96 extend through the outer shell 12, the layer 14 of refractory material, and into the muffle 44 of each brazing zone, and are used to send a signal to the controller 160 to adjust the firing of the burners 55 (i.e., turning them on, more or less) so as to control the temperature in each of the convective brazing zones 45a–45n. The first thermocouples 96 are mounted through external connection pipes (not shown) which are welded to the muffle 44 so as to form a gas-tight seal and are operatively attached to the sliding seals 82 so that they are allowed to move in conjunction with the muffle 44.

The first thermocouples 96 are placed within the muffle 44 and in the flow of the processed gas between the muffle 44 and recirculation baffle. The first thermocouples 96 output the real-time temperature of the processed gas flowing in the muffle 44 on line 161 to the controller 160 as a processed electrical signal. Accordingly, the first thermocouples 96 help the control system 150 determine if the burners 55 are heating the furnace 10 to a preset temperature set point. In other words, depending on the processed electrical signal received by the controller 160 from the first thermocouples 96 on line 161, the controller 160 will open or close a valve (not shown) which allows more or less fuel gas to go to the burners 55 that provide heat to the exterior of the muffle 44. The heated muffle 44 then transfers the heat to the workpiece 81.

The second set of thermocouples 98 also extend through the outer shell 12, the layer 14 of the refractory material and into the heating chamber 16, and are used to detect excess temperature conditions caused by the first thermocouples 96 or other mechanical failure that would require shutting off the burners 55. In other words, the second thermocouples 98 are outside the muffle 44 but are inside the heating chamber 16. The second thermocouples 98 output the real-time temperature of the heating chamber 16 on line 162 to the controller 160 as a processed electrical signal. Accordingly, the second thermocouples 98 help prevent the temperature of the heating chamber 16 from exceeding a temperature that is outside the predetermined operating capabilities of the muffle 44.

The third set of thermocouples 170 are positioned directly above the workpiece 81. The fourth set of thermocouples 180 are positioned directly beneath the workpiece 81. The third and fourth thermocouples 170 and 180 measure real-time temperatures of their respective locations to accurately determine the temperature of the heat from the processed gas being received by the workpiece 81 while the workpiece 81 is traveling between the third and fourth thermocouples 170 and 180 along the conveyor 86.

When a workpiece 81 is in a brazing zone, a thermocouple in the third set of thermocouples 170 outputs the measured real-time temperature of the processed gas after the gas has received heat from the surface area of the muffle walls and is directed perpendicularly and downwardly toward the workpiece 81 by the louvers 84. The measured real-time temperature is output by the third thermocouples 170 on line 171 to the controller 160 as a processed electrical signal. Each third thermocouple 170 is a set point thermocouple which also outputs a processed electrical signal on line 171 to the controller 160 when the temperature measured above the workpiece 81 has reached a soak temperature. The soak temperature is the temperature at which the workpiece 81 is to be exposed to the heated gas for a predetermined period of time to braze and/or anneal the workpiece 81.

Each thermocouple of the fourth set of thermocouples 180 is a process-variable thermocouple positioned beneath the workpiece 81 to measure the temperature of the recirculated gas after the gas has passed through the cold workpiece 81. The fourth thermocouples 180 output the measured real-time temperature of the recirculated gas after having passed through the workpiece 81 on line 181 to the controller 160 as a processed electrical signal.

Because the cold workpiece 81 absorbs most of the heat from the recirculated gas as the gas passes through the workpiece 81, the third thermocouples 170 measure a higher temperature than is measured by the fourth thermocouples 180. As such, the temperature difference $\Delta T$ between the third and fourth set of thermocouples 170 and 180 is positive. Accordingly, the controller 160 adjusts the operating performance of components of the furnace 10 according to the processed electrical signals received from the four sets of thermocouples 96, 98, 170 and 180.

In an exemplary embodiment of the invention, the controller 160 adjusts the operating performance of the components of the furnace 10 using a proportional integral derivative closed-loop to control the fan speed and real-time temperature of the muffle 44 and heating chamber 16.

The controller 160 processes the electrical signals received from the first and second thermocouples 96 and 98. The controller 160 outputs a drive current on the line 163 to the valve (not shown) which allows more or less gas to go to the burners 55. The controller 160 adjusts the real-time temperatures of the muffle 44 and heating chamber 16 using the drive signal output on line 163. This adjustment persists until the temperature measured by the first thermocouple 96 achieves a set point in agreement with a desired soak temperature. Consequently, the controller 160 outputs the drive current on the line 163 to open or close the valve to maintain the desired soak temperature.

The controller 160 also processes the electrical signals received from the third and fourth thermocouples 170 and 180. The controller 160 outputs a drive signal on line 164 to the fan 70 to increase or decrease fan speed. The controller 160 adjusts the fan speed using the drive signal on line 164. This adjustment persists until the temperature difference $\Delta T$ approaches zero.

Thus, when the workpiece 81 is cold, the temperature difference $\Delta T$ is positive, i.e., the temperature measured by the third thermocouples 170 are higher than the temperature measured by the fourth thermocouples 180, and the controller 160 outputs the drive signal on line 164 to increase the fan speed. Contrarily, when the temperature difference $\Delta T$ is negative, i.e., the temperature measured by the third thermocouples 170 are less than the temperature measured by the fourth thermocouples 180, the controller 160 outputs a drive signal on line 164 to bring the fan speed to zero, i.e., stop the rotation of the fan 70.

When the temperature of the workpiece 81 achieves the desired soak temperature, the temperature measured by the fourth thermocouple 180 should also achieve the desired soak temperature. In other words, the temperature difference $\Delta T$ reaches zero whereupon the fan speed is maintained by the controller 160. Thus, when the first and second real-time temperatures correspond with the desired soak temperature, i.e., $\Delta T=0$, a timer 165 is initiated to soak the workpiece 81 at the desired soak temperature for a predetermined amount of time. As such, by controlling how much heat is provided to the furnace 10 by the burners 55 and the fan speed in the muffle 44, the control system 150 ensures the fastest possible heating temperature is achieved while minimizing any disturbance of the workpiece 81.

When the third and fourth thermocouples reach the same temperature, i.e., the soak temperature, maximum ramp rate is achieved. As such, the control system 150 ensures the temperature of the workpiece 81 is constant throughout the workpiece 81 and that the workpiece 81 is heated in the shortest possible time. Although, large and small components are not heated in the same time, if loaded separately, such components will braze with the same brazing parameters.

In operation, the furnace 10 is initially turned on and preheated to a predetermined operating temperature. When the temperature of recirculated processed gas in the muffle 44 reaches the desired soak temperature, a workpiece 81, such as prefluxed aluminum heat exchangers, for example, is loaded onto the conveyor 86. Thereafter, the workpiece 81 enters via the front door 32 into the entrance chamber 30 and is passed through the atmospheric curtains 31 into the first convective brazing zone 45a of the furnace 10. As the workpiece 81 passes through the atmospheric curtains 31, it is exposed to a stream of exiting process gas which removes trapped air therefrom in order to prevent oxygen contamination within the brazing zone 45a.

As the workpiece 81 passes through each successive brazing zone, the hot gases are driven around and through the workpiece 81 at a very high velocity by the circulating fans 70. The controller 160 adjusts the speed of the fan 70 based on the temperatures measured by the third and fourth thermocouples 170 and 180 to permit the temperature of the muffle 44 to approach the soak temperature as rapidly as possible. Simultaneously, the workpiece 81 absorbs the heat from the hot gas and lowers the temperature of the gas. As such, the decrease in temperature of the muffle 44 is detected by the first thermocouples 96 which simultaneously sends the processed electrical signal to the controller 160 on line 161. The controller 160 then increases or decreases the firing rate of the burners 55 so as to return the temperature in the heating chamber 16 to the desired soak temperature. As the burners 55 fire, the walls of the muffle 44 become hotter. As a result, the heat from the walls is transferred to the processed gas by the scrubbing action due to the high velocity circulating current around the inner walls of the muffle 44.

This heating process is continued as each workpiece 81 passes through the successive convective brazing zones until the workpiece 81 reaches the soak temperature. At this time, the timer 165 is initiated by the controller so that the workpieces 81 are allowed to "soak" for a predetermined amount of time in the soak temperature so as to insure uniform temperatures throughout the workpiece 81 for melting a braze material covering the workpiece 81.

While conventional muffle furnaces could be used to braze aluminum sheet exchangers by heating them by natural convection and radiation, the length of these furnaces would, however, be required to be extremely long so as to prevent localized temperatures from melting the aluminum heat exchangers. This is because certain braze materials for aluminum have a melting point which is very close (within 100° F.) to the melting point of aluminum. The forced convection muffle furnace 10 of the invention produces temperature uniformity throughout the convective brazing zones so as to effect a substantially uniform heating rate. Further, since the present muffle furnace is direct-fired, there is less fuel cost than the prior art furnaces utilizing radiant tubes.

The foregoing detailed description shows that the invention provides a convection muffle furnace system and method for brazing and/or annealing a workpiece 81 which includes a muffle 44 having towers 68 formed integrally therewith and being mounted movable relative to the top wall 28 of the furnace 10. Circulation fans 70 disposed in the towers 68 so as to move along with the muffle 44 during its expansion and contraction thereby producing forced convection heat transfer.

Furthermore, the furnace can process workpieces 81 that are totally different, one workpiece 81 right after another. The muffle 44 design provides uniform temperature within the workpiece 81 area. Convection heating and accurate temperature control and uniformity are essential when running workpieces 81 with inconsistent masses and configurations.

As such, the brazing furnace is insulated in its entirety with lightweight ceramic fiber insulation, and is heated with high velocity natural gas burners. Thus, the combination of low heat storage insulation, with maximum heating potential gas burners, allows extremely fast response times for heating or cooling. Also, the recirculating fan provides a heating and distribution system unequaled for fast heating and uniformity of temperature. Since the convection muffle design is judiciously low in volume, atmosphere integrity is achieved with low nitrogen consumption.

While there has been illustrated and described what is at present considered to be a preferred embodiment of the present invention, it will be understood by those skilled in the art that various changes and modifications may be made, and equivalents may be substituted for elements thereof without departing from the true scope of the invention such as, for example, using electric heating elements to heat the exterior of the muffle, rather than direct-fired burners. In addition, many modifications may be made to adapt a particular situation or material to the teachings of the invention without departing from the scope thereof. Therefore, it is intended that this invention not be limited to the particular embodiment disclosed herein, but will include all embodiments within the spirit and scope of the disclosure.

What is claimed is:

1. A temperature control system for obtaining a desired soak temperature of a workpiece driven through a brazing and annealing system having a convection muffle that heats the workpiece within a brazing zone of the brazing and annealing system, the temperature control system comprising:

a first thermocouple positioned inside the convection muffle above the workpiece, the first thermocouple measuring a first real-time temperature of an atmospheric convection current before the workpiece absorbs heat from the atmospheric convection current;

a second thermocouple positioned inside the convection muffle beneath the workpiece, the second thermocouple measuring a second real-time temperature of the atmospheric convection current after the workpiece has absorbed the heat from the atmospheric convection current; and a controller that measures a brazing temperature of the atmospheric convection current directed toward the workpiece based on a temperature difference between the first and second real-time temperatures measured by the first and second thermocouples until the brazing temperature of the atmospheric convection current corresponds to the desired soak temperature at which point the controller initiates a timer so that the workpiece is soaked at the desired soak temperature for a predetermined amount of time.

2. The temperature control system according to claim 1, further comprising a circulating fan in a roof of the muffle that creates the atmospheric convection current directed towards the workpiece.

3. The temperature control system according to claim 2, wherein the controller increases a fan speed of the fan when the temperature difference between the first and second real-time temperatures is greater than zero.

4. The temperature control system according to claim 2, wherein the controller maintains a fan speed of the fan when the temperature difference between the first and second real-time temperatures is substantially zero.

5. The temperature control system according to claim 2, wherein the controller decreases a fan speed of the fan when the temperature difference between the first and second real-time temperatures is less than zero.

6. The temperature control system according to claim 1, further comprising:
a third thermocouple positioned within the muffle and distal from the workpiece, the third thermocouple measuring a third real-time temperature of a processed gas directed towards an interior of the muffle, wherein the controller adjusts an amount of a fuel gas provided to direct-fired burners that heats the exterior of the muffle to adjust the brazing temperature of the atmospheric convection current directed towards the workpiece.

7. The temperature control system according to claim 6, wherein the controller increases the amount of the fuel gas provided to the direct-fired burners that increases the brazing temperature of the atmospheric convection current.

8. The temperature control system according to claim 6, wherein the controller maintains the amount of the fuel gas provided to the direct-fired burners to maintain the brazing temperature of the atmospheric convection current.

9. The temperature control system according to claim 6, wherein the controller decreases the amount of the fuel gas provided to the direct-fired burners to decrease the brazing temperature of the atmospheric convection current.

10. The temperature control system according to claim 6, wherein the controller increases a fan speed of the fan when the temperature difference between the first and second real-time temperatures is greater than zero.

11. The temperature control system according to claim 6, wherein the controller maintains a fan speed of the fan when the temperature difference between the first and second real-time temperatures is substantially zero.

12. The temperature control system according to claim 6, wherein the controller decreases a fan speed of the fan when the temperature difference between the first and second real-time temperatures is less than zero.

13. A convection muffle system for brazing and/or annealing a workpiece, the convection muffle system comprising:
a heating chamber that includes a bottom wall, a pair of side walls, a front wall, a rear wall and a top wall;
a muffle that includes side walls, a floor and a roof, the side walls of the muffle being positioned in a parallel, spaced-apart relationship to the side walls of the heating chamber and extending from the front wall of the heating chamber to the rear wall of the heating chamber, and the muffle being divided into a plurality of successive individual brazing zones which are spaced apart;
a plurality of towers each formed in the roof of the muffle in each brazing zone, each tower being movable relative to the top wall of the heating chamber;
a plurality of circulating fans, each circulating fan being mounted and sealed in a corresponding one of the plurality of towers to create an atmospheric convection current in each of the brazing zones, the fans being movable along with the muffle during expansion and contraction of the muffle;
direct-fired burners that heat the exterior of the muffle to increase the temperature of the atmospheric convection current; and
a temperature control system that obtains a desired soak temperature of a workpiece driven through the muffle, the temperature control system comprising:
a first thermocouple positioned inside the muffle above the workpiece, the first thermocouple measuring a first real-time temperature of the atmospheric convection current before the workpiece absorbs heat from the atmospheric convection current;
a second thermocouple positioned inside the muffle beneath the workpiece, the second thermocouple measuring a second real-time temperature of the atmospheric convection current after the workpiece has absorbed the heat from the atmospheric convection current; and
a controller that measures a brazing temperature of the atmospheric convection current directed toward the workpiece based on a temperature difference between the first and second real-time temperatures measured by the first and second thermocouples until the brazing temperature of the atmospheric convection current corresponds to the desired soak temperature at which point the controller initiates a timer so that the workpiece is soaked at the desired soak temperature for a predetermined amount of time.

14. The temperature control system according to claim 13, wherein the controller increases a fan speed of the fan when the temperature difference between the first and second real-time temperatures is greater than zero.

15. The temperature control system according to claim 13, wherein the controller maintains a fan speed of the fan when the temperature difference between the first and second real-time temperatures is substantially zero.

16. The temperature control system according to claim 13, wherein the controller decreases a fan speed of the fan when the temperature difference between the first and second real-time temperatures is less than zero.

17. The temperature control system according to claim 13, further comprising:
a third thermocouple positioned within the muffle and distal from the workpiece, the third thermocouple measuring a third real-time temperature of the processed gas directed towards an interior of the muffle, wherein the controller adjusts an amount of a fueled gas provided to direct-fired burners to adjust the brazing temperature of the atmospheric convection current directed towards the workpiece.

18. The temperature control system according to claim 13, wherein the controller increases the amount of the fuel gas provided to the direct-fired burners for increasing the brazing temperature of the atmospheric convection current.

19. The temperature control system according to claim 13, wherein the controller maintains the amount of the fuel gas provided to the direct-fired burners to maintain the brazing temperature of the atmospheric convection current.

20. The temperature control system according to claim 13, wherein the controller decreases the amount of the fuel gas provided to the direct-fired burners to decrease the brazing temperature of the atmospheric convection current.

21. A method of obtaining a desired soak temperature of a workpiece driven through a brazing and annealing system having a convection muffle that heats the workpiece within a brazing zone of the brazing and annealing system using a temperature control system, the method comprising the steps of:

positioning a first thermocouple inside the convection muffle above the workpiece;

positioning a second thermocouple inside the convection muffle beneath the workpiece;

directing an atmospheric convection current towards the workpiece;

measuring a first real-time temperature of the atmospheric convection current directed towards the workpiece before the workpiece absorbs heat from the atmospheric convection current;

measuring a second real-time temperature of the atmospheric convection current after the workpiece has absorbed the heat from the atmospheric convection current;

measuring a brazing temperature of the atmospheric convection current based on a temperature difference between the first and second real-time temperatures until the brazing temperature corresponds to the desired soak temperature; and initiating a timer so that the workpiece is soaked at the desired soak temperature for a predetermined amount of time.

22. The method according to claim 21, further comprising the step of creating the atmospheric convection current using a circulating fan in a roof of the muffle.

23. The method according to claim 22, further comprising the step of increasing a fan speed of the fan when the temperature difference between the first and second real-time temperatures is greater than zero.

24. The method according to claim 22, further comprising the step of maintaining a fan speed of the fan when the temperature difference between the first and second real-time temperatures is substantially zero.

25. The method according to claim 22, further comprising the step of decreasing a fan speed of the fan when the temperature difference between the first and second real-time temperatures is less than zero.

26. The method according to claim 21, further comprising the steps of:

positioning a third thermocouple within the muffle and distal from the workpiece;

measuring a third real-time temperature of a processed gas directed towards the exterior of the muffle; and adjusting an amount of a fuel gas provided to direct-fired burners that heat the exterior of the muffle to adjust the brazing temperature of the atmospheric convection current directed towards the workpiece.

27. The method according to claim 26, further comprising the step of increasing the amount of fuel gas provided to the direct-fired burners to increase the brazing temperature of the atmospheric convection current.

28. The method according to claim 26, further comprising the step of maintaining the amount of fuel gas provided to the direct-fired burners to maintain the brazing temperature of the atmospheric convection current.

29. The method according to claim 26, further comprising the step of decreasing the amount of fuel gas provided to the direct-fired burners to lower the brazing temperature of the atmospheric convection current.

30. The method according to claim 26, further comprising the step of increasing a fan speed of the fan when the temperature difference between the first and second real-time temperatures is greater than zero.

31. The method according to claim 26, further comprising the step of maintaining a fan speed of the fan when the temperature difference between the first and second real-time temperatures is substantially zero.

32. The method according to claim 26, comprising the step of decreasing a fan speed of the fan when the temperature difference between the first and second real-time temperatures is less than zero.

* * * * *